United States Patent
Hed

Patent Number: 5,301,090
Date of Patent: Apr. 5, 1994

[54] LUMINAIRE

[75] Inventor: Aharon Z. Hed, 12 Wagon Trail, Nashua, N.H. 03062

[73] Assignee: Aharon Z. Hed, Nashua, N.H.

[21] Appl. No.: 851,620

[22] Filed: Mar. 16, 1992

[51] Int. Cl.⁵ .............................................. F21V 8/00
[52] U.S. Cl. ..................... 362/32; 362/101; 362/320; 362/373
[58] Field of Search ............. 362/1, 2, 32, 231, 96, 362/320, 101, 294, 373

[56] References Cited

U.S. PATENT DOCUMENTS

| | | | |
|---|---|---|---|
| 3,517,180 | 6/1970 | Semotan | 362/1 |
| 3,902,056 | 8/1975 | Aizenberg et al. | 362/1 |
| 4,885,663 | 12/1989 | Parker | 362/32 |
| 4,907,132 | 3/1990 | Parker | 362/32 |
| 4,933,813 | 6/1990 | Berger | 362/2 |
| 5,031,078 | 7/1991 | Bornhorst | 362/32 |

*Primary Examiner*—Richard R. Cole
*Attorney, Agent, or Firm*—Herbert Dubno

[57] ABSTRACT

A luminaire which has in its housing a multiplicity of groups of light emitters of different colors or pluralities of optical waveguides constructed to emit light progressively along the lengths thereof and a diffuser at which the colors can be mixed and from which the light emerges. The emitters can be controlled at the housing or light can be delivered to the optical waveguides by optical fibers from remote light sources.

16 Claims, 8 Drawing Sheets

LUMINAIRE

CROSS REFERENCE TO RELATED APPLICATIONS

This application relates to my copending applications Ser. No. 07/788,184 filed on Nov. 5, 1991, entitled "Light Weight Low Loss Refractive Light Diffusion System" and Ser. No. 07/813,972 filed Nov. 26, 1991 entitled "Controlled Light Extraction From Light Guides and Fibers" now U.S. Pat. No. 5,222,795 issued Jun. 29, 1993.

FIELD OF THE INVENTION

The present invention relates to a lighting device or apparatus, hereinafter referred to generally as a luminaire, for general or specified lighting of an area or space and, more particularly, to a family of highly homogeneous controlled color light sources as well as controlled color luminaires. The invention relates to a luminaire which can be powered remotely, i.e. can emit in a homogeneous fashion light which is transmitted to it from a distance, to a luminaire which is flexible and foldable so as to be deployable under field conditions, and to a luminaire intended for environmental modification, therapy and/or decorative lighting purposes.

BACKGROUND OF THE INVENTION

In general, artificial light sources are available in either a predetermined broad spectrum or in an almost monochromatic form. Some well known "white" light sources include incandescent lamps, high intensity discharge (HID) light sources and fluorescent light sources. Among the better known monochromatic light sources we can cite light emitting diodes, lasers of all types and gas discharge tubes. What has not been freely available heretofore, is an efficient light source with a temporally variable spectral output, or at least a time-variable appearance. Currently, when the need for such means of illumination arises, one can either use filters to allow only part of the spectrum of a white light source to be seen, or, one can use discrete light sources of different spectral distribution to illuminate a single scene. Both of these approaches are cumbersome.

For instance, when using filters, the segment of the spectrum filtered out is lost to absorption and thus there is a major reduction in the system efficiency. It is desirable to have flat light sources with variable chromaticity and a large degree of luminance homogeneity, which can be modular so as to allow for stepwise increase in total light output from single powering source.

In most current lighting systems, the conversion of electrical power to light flux occurs at the point of use of the light. Since the efficiency of conversion of electricity to visible light is rarely more than 25%, and in some very large light sources, 30%, a large amount of heat must be dissipated at the point of use of the light. Furthermore, there are special situations, particularly in hazardous environments, where it is not desirable to have electrical connectors, conductors or any electrically powered devices within the space that is to be illuminated. In such areas the light sources and their associated wiring must be enclosed in special enclosures, a fact that increases installation costs and reduces efficiency of light output utility. It is thus desirable to provide luminaires which are remotely powered so as to allow for heat withdrawal at the remote location where electricity is converted to light, allow safe installation in hazardous environment, and provide for controllable chromaticity.

Light sources of the latter type can be used in a broad variety of environments including photographic dark rooms, semiconductor and other clean room manufacturing environments as well as in chemical plants where explosive or flammable products are being manufactured.

OBJECTS OF THE INVENTION

The principal object of the invention is to provide an improved lighting apparatus which is free from the drawbacks described, has one or more of the advantages outlined and which is efficient and reliable.

It is another object of the instant invention to provide light sources whose chromatic appearance can be modulated.

It is yet another object of the instant invention to provide such light sources in a modular form. It is yet another object of the instant invention to provide luminaires where the energy conversion processes from the power source to luminous flux occurs at a site distant from the point of use of the light.

It is yet another object of the instant invention to provide for such luminaires that are portable and easily foldable, inflatable and deployable. It is yet another object of the instant invention to provide luminaires that are washable and can be immersed in water without the danger of shorting live electrical wires or contacts since dust accumulation on light sources can severely degrade their performance due to light absorption by the dust.

It is also an object of the invention to provide a luminaire particularly suitable for the modification and re-setting of human circadian cycle, as taught by C. A. Czeisler in U.S. patent application Ser. No. 07/066,677, where very high intensity light sources capable of delivering at least 7500 lux are required, and, when desired, without having to discharge the heat generated from such light sources within the space where the light is used.

SUMMARY OF THE INVENTION

These objects and others which will become apparent hereinafter are attained, in accordance with the instant invention by a unique system for mixing colored light. In a first aspect of the invention, an array of complementary colored light sources (red, green and blue) is embedded within luminaire whose chromaticity is controlled by controlling the output of the three groups of light sources. The light from these sources can be intermixed with the help of the specially designed light diffuser disclosed in copending application Ser. No. 07/788,184.

In a second aspect of the invention, light is transmitted from remotely positioned complementary light sources to a luminaire which contains light extraction elements as described in copending application Ser. No. 07/813,972(U.S. Pat. No. 5,222,795), the light from the three colored light sources is then intermixed and irradiated through the surface of the luminaire with the help of similar diffusers. In both cases chromatic control of the appearance of the luminaire is obtained.

The light extractor based luminaire can be used for dual color applications, like the control and shifting of human circadian cycle, clean rooms in semiconductor foundries and photographic dark rooms.

The principles of the instant invention are applicable to the illumination of industrial, petrochemical and other hazardous environment, that use the unique feature of the instant invention that provides for the remote location of light sources from the point of use of the light and the unique homogeneous distribution of light obtained from the luminaires of the instant invention, are described as well. Similarly, the immunity of the luminaires to immersion in water, derived from the same feature of remote location of the light source, serves as a basis for illuminating devices that can be used in conjunction with wet environment like bathing units, steam baths, swimming pools and other unique applications.

More particularly, the luminaire according to the invention can comprise:

a housing;

a light-transmissive diffuser extending across the housing for diffusing light impinging upon the diffuser from within the housing;

a multiplicity of groups of light emitters in the housing, each group consisting of three emitters emitting light of complementary colors, the groups being spaced apart over an area of the diffuser, whereby the light from the emitters in a group mixes at and is diffused by the diffuser; and means for energizing the light emitters.

In general, where I use the term "monochromatic" to describe the light emitted by one of the light sources of a group, it should be noted that the term is intended to be used in a loose sense to indicate that the sources have different output colors and that the colors are selected so that the combination of light colors emitted by the group has the desired composite effect, e.g. white light. The "monochromatic" light of each emitter can have a wider or narrower band width as desired.

Alternatively, the luminaire can comprise:

a light-transmissive diffuser extending across the housing for diffusing light impinging upon the diffuser from within the housing;

a multiplicity of elongated light guides in the housing emitting light over respective lengths thereof; and means at an end of the housing for injecting light into corresponding ends of the light guides.

The diffuser is preferably of the type described in the aforementioned copending application Ser. No. 07/788,184 which is hereby incorporated in its entirety by reference and comprises two spaced-apart diffuser layers and, where the light-emitting members are optical waveguides or fibers, that may be constructed and configured as described in my copending application Ser. No. 07/813,972 (U.S. Pat. No. 5,222,795), also incorporated in its entirety by reference herein, the optical waveguides or fibers having a cladding removed over the length of the optical waveguide or of varying refractive index to provide for the controlled light emission along the length thereof.

The diffuser can form a wall of a space to be illuminated, for example, the wall of a room, of a bathing facility or of a treatment facility for modifying the circadian rhythm, or a wall of a bathing device such as a shower or bath enclosure, swimming pool or the like.

The means for energizing can include control means at the housing for controlling the outputs of the light emitters of different color and thereby controlling the color balance and intensity of the luminaire, or means remote from the housing and connected to the housing by electrical conductors where the light sources are emitters in the housing or by optical waveguides or light-conducting fibers where the light source is, or light sources are, remote from the housing.

The control means can include means for selectively energizing the light emitters of one group differently from the light emitters of another of these groups to provide a surface whose appearance can be modified zonally.

The luminaire may be one of a plurality of panels assembled together by plug and socket means and where light conductors are used to distribute the light from a common source, the conductors may be branched to the different panels.

The housing, diffuser and array of light emitters or optical waveguides may be flexible to allow bending and/or inflation and deflation of the luminaire and, as noted, the luminaire may have sufficiently high intensity and control means to provide for light induced circadian cycle modification and shifting.

BRIEF DESCRIPTION OF THE DRAWING

The above objects, features and advantages of the instant invention will become more readily apparent from the following description, reference being made to the accompanying drawing in which.

SPECIFIC DESCRIPTION

Figure 1:
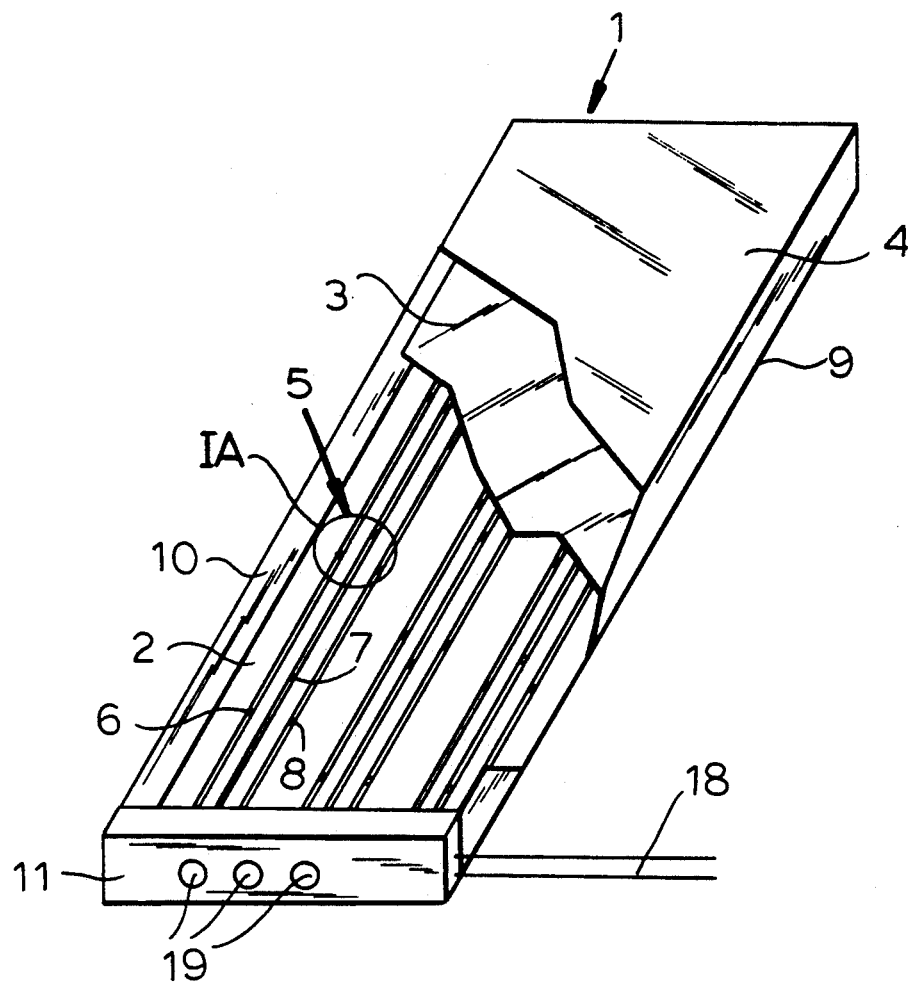
FIG. 1 is a perspective view, partly cut away, of an LED-based chromatic luminaire according to the invention.
Figure 1A:
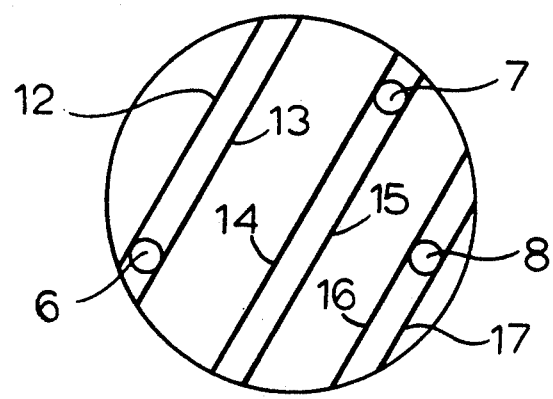
FIG. 1A is detail view of the region IA of FIG. 1.

FIGS. 1 and 1A show a luminaire 1 which consists of a box-like structure having essentially three parallel sheets or planes, 2, 3 and 4. The inner surface of the bottom sheet 2, is a highly reflective material or is coated with a highly reflective material. This coating can be either a specular or a diffuse reflector. In the former case, aluminized Mylar can be used; in the latter case, one can use 3M's V-5115 Scotch ™ Light Extractor Film, or a highly reflective paint like Spraylat Corporation's Lacryl Series 20-02 matte white paint.

An array of groups 5 of light sources 6, 7, 8 are fastened on the bottom sheet 2, and include respectively a red light source, a green light source and a blue light source. The light sources are mounted in such a way that the light is emitted to the inner space of the box and toward the middle plane 3. The middle sheet 3 and the top sheet 4 are light diffusing screens as described in my copending application Ser. No. 07/788,184 entitled "Light Weight Low Loss Refractive Light Diffusion System". In essence, the two sheets and 4 form one diffusing screen.

The three main sheets of the luminaire are assembled into the box shown in FIG. 1, with side panels like the panels 9 and 10 and a front element 11 which houses the electrical connections and control system for the luminaire. The power line 18 depicted in FIG. 1, can be replaced with a more complex set of conductors which can carry control signals to the luminaire in order to change its chromatic appearance as more fully described below.

FIG. 1A shows the details of one group 5, of the tricolor light sources. As can be seen, each light source is fed by two parallel conductors. These are the conductors 12 and 13 for the red light source 6, conductors 14 and 15 for the green light source 7 and conductors 16 and 17 for the blue light source 8.

Therefore, all the light sources of a given color (red, green or blue) within a given row of the array are powered in parallel by the same pair of conductors. By assuring that the same pair of wires powers the same color light sources in all the rows of a given luminaire (which can easily be done by correctly connecting the extremities of the conductor pairs, either in parallel or in series), I can control the amount of light emitted by each set of light sources according to their color.

While in FIGS. 1 and 1A the light emitting diodes are shown to be relatively widely spaced apart, it should be understood that in practice the light emitting diodes within a group are spaced as close together as is practical.

The use of the dual screen diffuser composed of the sheets 4 and 3, assures that light emitted from the individual light sources emanates from the outer surface of the luminaire completely intermixed. This can be achieved by having the periodicity of the screens be a whole multiple (including the same period) of the period of the light sources groups. Another means to achieve the same goal is to place the three light sources in each group adjacent to each other, so light from them cannot be optically resolved. The latter implementation is particularly useful when using solid stat light sources in the form of very small light emitting diodes as described below.

It has been known for quite some time that one can duplicate the appearance to the human eye of any color by the appropriate admixture of light from three primary colored and monochromatic light sources. The choice of the three primary colors is not necessarily unique, and many different sets of color matching functions are possible. One standard was adopted in 1931 by the International Commission on Illumination (CIE), and this standard is the basis of modern chromatic scales. This standard uses basically the summation of light sources with the primary colors red, green and blue (or the RGB system), to match any desired color perception.

The subject is discussed in "Principles of Color Technology" by Billmeyer, F.W. and Salzman M., 2nd edition, 1981, published John Wiley & Sons, or in "Light, Color and Vision" by LeGrand Y. 2nd edition, 1957, published by Wiley (Interscience). Therefore, by controlling the intensity of the light emitted by the three types of light sources within the groups that form the array in the luminaire described in FIG. 1, I can control the chromaticity or color appearance of the luminaire. This is achieved either with the control knobs 19, which in essence are rheostats controlling the power to all the green, the red and the blue light sources respectively, or through an appropriate control line consolidated in the power line 18.

In the preferred embodiment of the luminaire shown in FIG. 1, the light sources are simply small light emitting diodes, or LED's. These are available in a large variety of shapes and flux outputs from a number of manufacturers. For instance Hewlett Packard of California provides a full line of LED's ranging in size from miniature devices to large devices having luminosity in the rang of microcandela to one candela. Hewlett Packard supplies both red (wavelength typically around 630 nanometers) and green (wavelength typically 560 nanometer) light emitting diodes suitable for the instant invention.

These commercial LEDs are usually encapsulated to facilitate mounting and shipment. In the instant invention one can use such commercial LEDs as well as purchase LEDs dies (not encapsulated, and thus lower the overall cost of system) and solder the dies to the their respective conductors directly.

Until recently, blue LEDs were not available, this due to the need for relatively large band gap semiconductors. In the last two years, however, advances in silicon-carbide based semiconductors have made blue LEDs available, and at least one company, Cree Research (Durham, N.C.) is providing blue LEDs on a commercial basis. One of the advantages in using LEDs as the light sources in the instant invention is the fact that the output of the LED scales with the voltage applied over a relatively large range. As a result, one can control the light output and the chromaticity of a luminaire over a relatively large range.

In the prior art, one usually uses a traditional white light source and controls the color by filtering out the desired parts of the spectrum. This approach is wasteful of the energy resources available to power such light, since the absorbed segment of the spectrum is converted to heat in the absorbing medium.

In the instant invention, I can create the desired color by adding primary colors at the desired ratio to yield th desired chromaticity, and need not absorb any part of the light emitted by the colored light sources. This approach has the additional advantage that one can easily modulate the light chromaticity in a continuous fashion by adjusting the power to the three different groups of primary color light sources. Such adjustments are extremely difficult to achieve in the prior art.

FIG. 1 shows a specific arrangement of the LEDs, namely they are arranged in rows of RGB groups, with all the groups within a column having the same relative orientation and with adjacent columns having mirror inverted orientation. It should be understood that other symmetries will result in operative embodiments as well. For instance, the light emitting diodes can be arranged in columns of groups all having the same symmetry. The order of the colors between adjacent columns need not be kept the same in all columns. The groups of light sources are shown in FIG. 1 to form rows of groups, but other arrangements will result in operative embodiments as well, for instance groups in adjacent columns can be displaced relative to each other.

Figure 2:
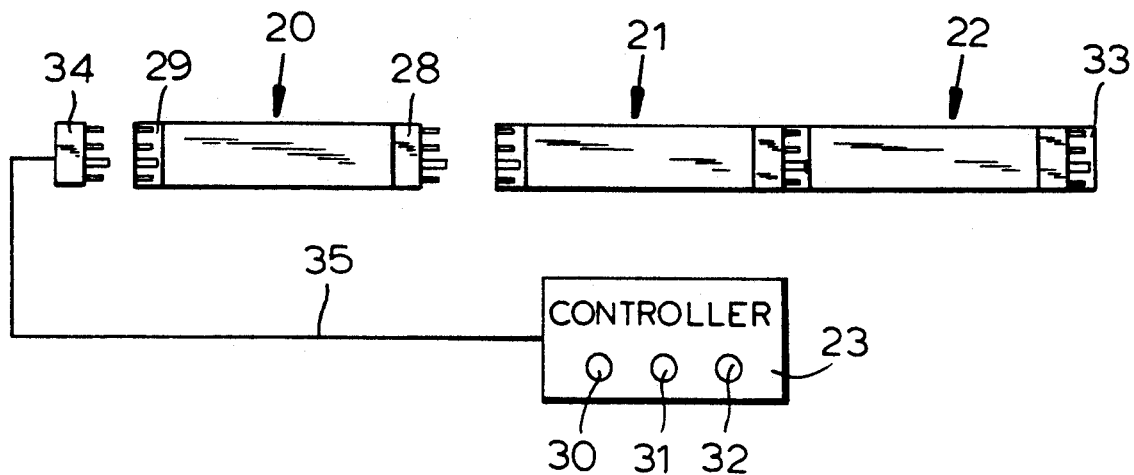
FIG. 2 of a system of modular LED-based luminaire.

Light sources as shown in FIG. 1 can be easily adapted to provide for modular lighting. Namely, one can affix a frontal multi-prong male plug and a back plane mating female plug to these luminaires so that they can be inserted into each other to provide a light source of any practical length. Such an arrangement is shown in FIG. 2, where a top view of three luminaires 20, 21 and 22 of the instant invention are depicted. Each of these luminaires is essentially a device as shown earlier in FIG. 1, which can be fastened to the others with the multi-pronged assemblies 28 and 29, shown in more details in FIGS. 2A and 2B respectively. These fastening assemblies serve a dual role, first they allow for interconnecting adjacent luminaires, second they provide for electrical connections to the light emitting diodes within the luminaires.

In a preferred embodiment, the light sources are controlled from a single controller 23 which regulates the power to all red, all green and all blue light emitting diodes. To minimize the number of conductors, the multi-pronged fasteners, or plugs have four conductors, one conductor each, 24, 25 and 26 respectively, for the red, green and blue sets of light emitting diodes and one common ground conductor 27.

Figures 2A, 2B:
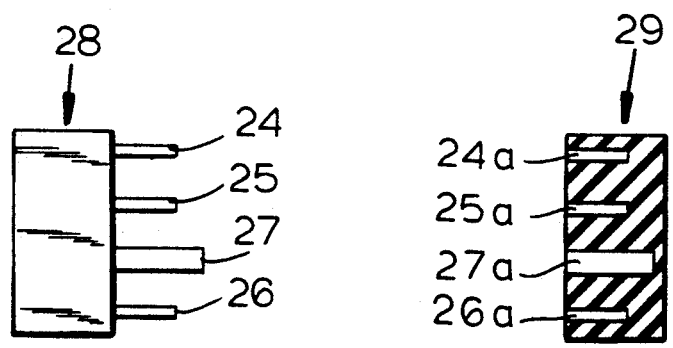
FIG. 2A is a diagram to a larger scale of a plug member at one end of such a modular luminaire.
FIG. 2B is a diagram of the female or socket member thereof.

FIG. 2B shows the female plug with its respective inserts 24a, 25a and 26a for the light emitting diode conductors and 27a for the common ground conductor. The plugs have a built-in asymmetry to assure correct interconnection between modules. In this fashion, the chromaticity of the total assembly is controlled from the single controller, through the control knobs 30, 31 and 32 respectively.

The assembly also includes a power feeding four-conductor cord 35 terminated with a plug 34 structured in the same fashion as the male plug 2 described in FIG. 2A. This allows for interfacing the controller 23 to the first luminaire 20 by simple insertion of the male plug 34 into the female plug 29 of the luminaire. When one assembles a series of luminaires by inserting each male plug in the female plug of the subsequent luminaire, one obtains a modular lighting system which can be sized according to the specific need. The last male plug in such a series would be exposed, and I thus provide for a contactless (insulating) cover, 33, having the same form as the female plug 29 described in FIG. 2B, to terminate the light assembly.

In some applications of the modular luminaires described in FIG. 2, one can use dedicated conductors to distribute power between different luminaires in a system while in some other applications, the conductors used to power the light emitting diodes are simply continued to the next luminaire through the multi pronged connectors.

Since the light emitting diodes of a given color are connected in parallel, the failure of a limited number of LEDs would not negatively impact the operation of the entire assembly.

It should be clear that these luminaires can be fastened to various surfaces by a variety of means, including the provision of a protruding perforated lug for screws or even an adhesive band on the back side of the luminaire.

Control functions can, of course, be associated with each separate luminaire rather than being consolidated into a single control module. When such a design is desired, then each luminaire has its own independent circuit, and the prongs are used to transfer the main power from luminaire to luminaire and a unique set of conductors is used for this purpose (namely, these conductor do not serve as direct power feeding lines to the individual light emitting diodes).

One of the advantages of the luminaires shown in FIG. 2 is that they can be constructed of relatively flexible materials. The conductors can be thin strips of copper deposited on plastic or partially embedded in a plastic substrate, as practiced in flexible planar cables. Since the light emitting diodes are relatively small, the whole assembly can be flexed and bent so as to fit on curved surfaces. Such flexible luminaires are not generally available in the prior art.

While in the above description of the preferred embodiment I have referred to the light sources as light emitting diodes, it should be understood that other monochromatic light sources could be used, including monochromatic miniature gas discharge ("neon light") light sources, or even incandescent light sources with appropriately colored external envelopes. It should be understood, however, that the latter method is extremely inefficient, in that only a very small percentage of the energy used to power the system results in visible light. The reason is that in the first place small incandescent light sources are very inefficient to start with, and second, a large proportion of their emitted light is absorbed in the process of rendering them "monochromatic".

Under some unique conditions, it might be desired to gradually change the chromatic appearance of the luminaire essentially on a zone by zone basis, so as to obtain, for instance, a surface whose chromatic appearance changes gradually from zone to zone. In this event, I can provide additional control lines to control the chromaticity of specific zones individually. In practice, the light emitting elements would be arranged in an array of groups, or the luminaire would be divided into segments with each array or segment having its own control line that can be controlled independently, according to the application.

For instance, one would provide for control of a column of groups of LEDs, but not for each group within the column. The utility of such devices would be mostly in advertising boards and displays, where one would draw a viewer's attention to a display by providing back illumination that varies in both space and time.

There are a number of applications where it is not desired to have electrical wiring within the luminaire and/or where the light sources need to be concentrated at one part of the luminaire to facilitate heat rejection. When this is the case, an alternative embodiment of the instant invention is provided, as shown schematically in FIG. 3, for the luminaire 40. This luminaire 40 has a general structure which is similar to that described in FIG. 1, in that it consists of a box having three parallel sheets 41, 42 and 43 fastened together as a container.

The base plane 41, is made of a highly reflective substance or is covered with a reflective substance. As above, this structure can be made of a variety of materials including flexible plastics. When inflexible substances are chosen, the base 41 inner surface can be covered with a white paint or films as described above. One can also use for some applications a specularly reflective inner surface like an aluminized (or silvered) Mylar film. Similar treatments are provided for all other reflective surfaces, like the side walls 44. The sheets 42 and 43 are two diffusion screens as described for the embodiment in FIG. 1 and are based on my copending application Ser. No. 07/788,184.

The box-like element 45, which can be termed the "light bar", contains complementary light sources, for instance monochromatic blue, red and green light emitting diodes or groups of such diodes. The light emitted from each such diode is concentrated by either refractive or by reflective optics into individual light extraction fibers, or light guides 46, 47 and 48. The optics is such that essentially all the light enters the extraction fibers within their respective angle of acceptance. The light extraction fibers are grouped in parallel and closely spaced groups, so that the light emanating from the extraction zone of each fiber is intermixed with light extracted from its neighboring fibers by the action of the dual diffusion screens 42 and 43, when it emerges from the light emitting screen 43.

Light extraction fibers or light guides suitable for this embodiment have been described in copending application Ser. No. 07/813,972 (U.S. Pat. No. 5,222,795) which is included herein by reference. In that application, a method is described by means of systems in which the light conducted through the non-extracting segment of the fiber is extracted along the extraction zone at a predetermined extraction rate. One such extraction rate is when the light emitted per unit length of the extraction zone is constant. When such extraction fibers are used for the elements 46, 47 and 48 inside the luminaire 40 of the instant invention, the light emanating from the light sources in the light bar is redistributed equally along the fibers within the light box 40.

Figure 3:
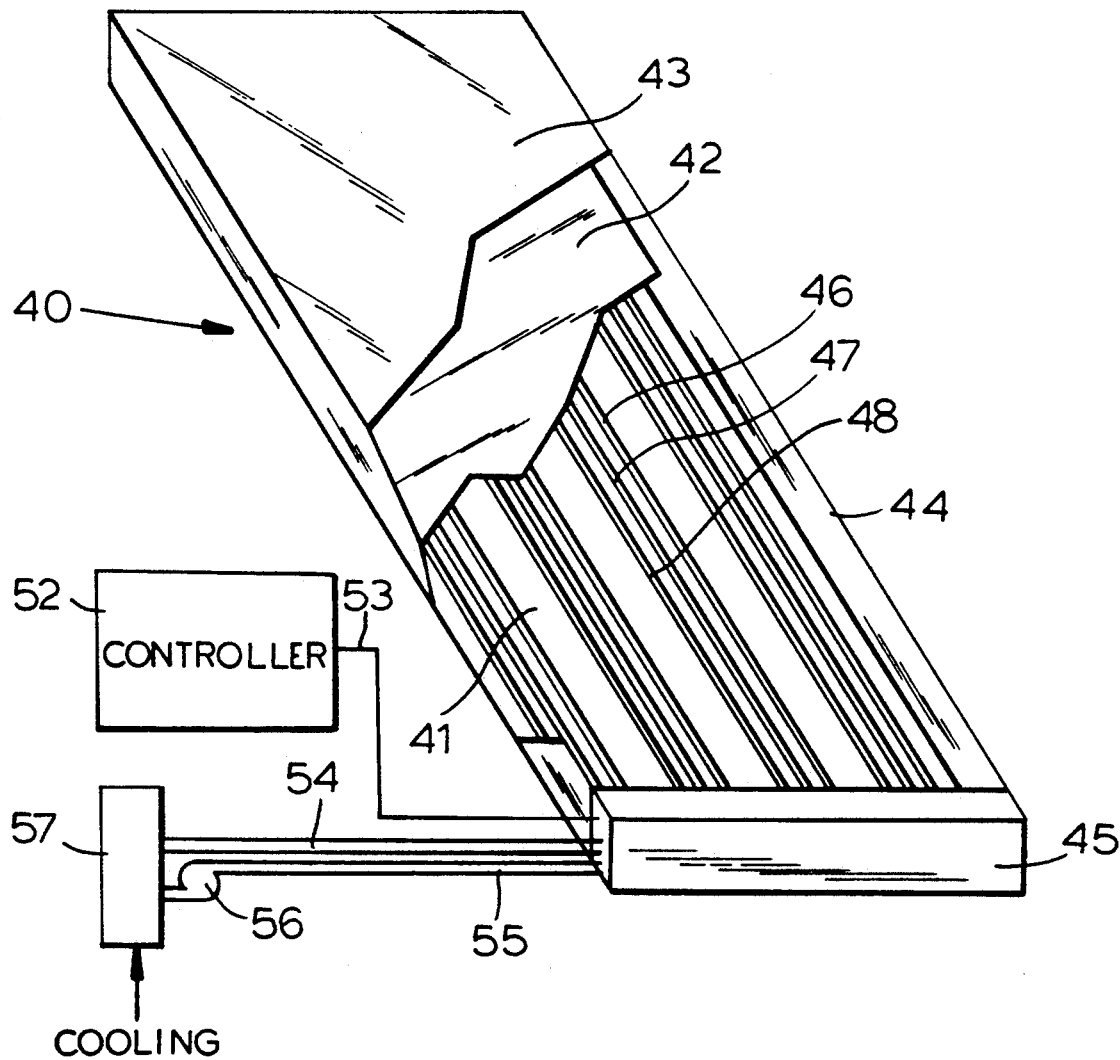
FIG. 3 is a schematic view similar to FIG. 1 of a chromatic luminaire based on light extractor fibers.
Figure 4A:
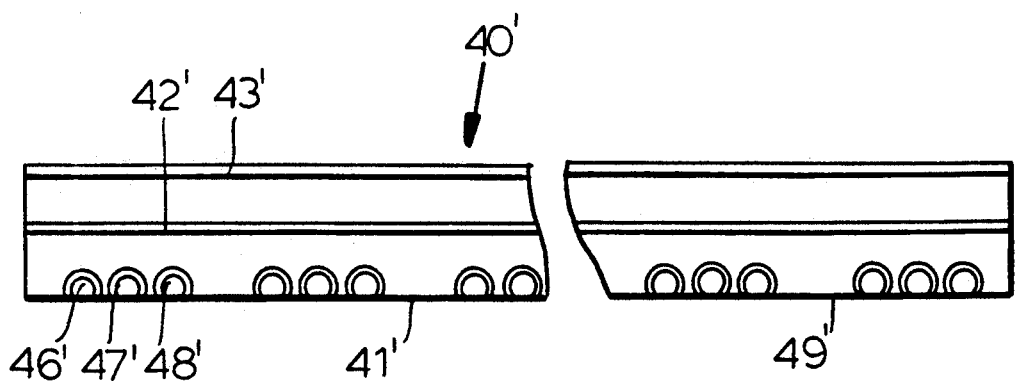
FIGS. 4A and 4B are diagrammatic cross sectional views of extractor-based chromatic luminaires.

A better understanding of the structure of the embodiment shown in FIG. 3 can be gained by reviewing FIG. 4A which is a schematic cross section through a luminaire 40' as shown in FIG. 3. Here the luminaire consists of three parallel sheets 41', the base of the luminaire with a highly reflective inner surface, and the two sheets 42' and 43' on which is embossed (embossment not shown) a tessellation of light diffus patterns as described in copending application Ser. No. 07/813,972 (U.S. Pat. No. 5,222,795). On the base surface 41' a plurality of groups 49' each containing three extraction fibers 46', 47' and 48', as described in copending application Ser. No. 07/813,972 (U.S. Pat. No. 5,222,795), are fastened.

Each fiber in the group 49' is a conduit to one of the three complementary light sources, preferably red, green and blue. In the embodiment shown in FIG. 4A, the extraction fiber 60 (with a cross section shown in greater detail in FIG. 4C) has a core 61 and a cladding 62. A variable (changing along the length of the extraction zone) portion, 63, of the cladding has been removed from the fiber and replaced with a white lambertially reflecting substance as described in the latter application. It should be clear, however, to those skilled in the art, that any of the different light extraction systems described in the aforementioned application would yield an operative luminaire of the instant invention.

By controlling the relative intensities of the monochromatic light sources within the light bar, I can thus obtain a variable chromaticity luminaire. The dual screens 42 and 43 of FIG. 3 (or 42' and 43' of FIG. 4A), assure the redistribution of the light from each group of three extraction fibers so as to provide diffuse light of any desired color on the outer viewed surface (43, or 43') of the luminaire.

This is accomplished with an electronic controller 52 as shown in FIG. 3, which controls the power to each group of light sources within the light bar 45, through a group of conductors 53. One can provide an optional cooling system including a circulating heat exchanging fluid entering the light bar via a tubular structure 54, and exiting the light bar via a second tubular structure 55. A pump 56 forces the cooling fluid through the light bar and the heated fluid flows back through a heat exchanger 57 (which can be a simple radiator to the outer environment). The light sources are thermally in contact with the tubular structure 5 within the light bar so as to discharge the heat generated by the light sources to the cooling heat exchanging fluid. Good fluids for that purpose are electrical insulators, for instance trimethylsiloxy terminated polydimethylsiloxanes and more specifically Petrarch Systems' PS040 (Bristol, Penna.).

Figure 4B:
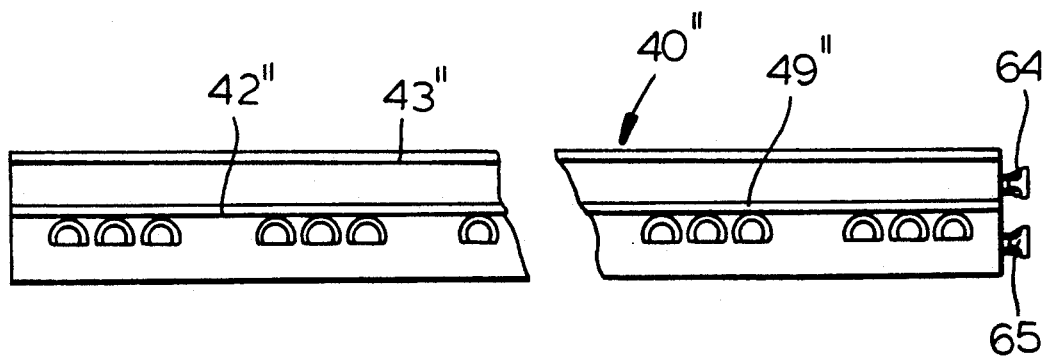
Figure 4C:
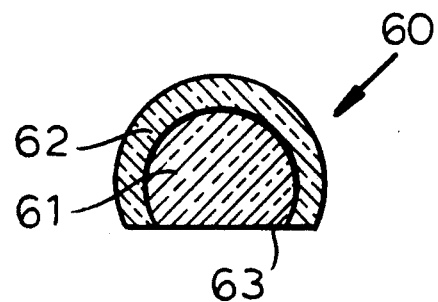
FIG. 4C a cross section through a light extractor used in such a luminaire.

FIG. 4B shows a cross section through yet another embodiment of the instant invention differing from the embodiments shown in FIGS. 3 and 4A only in the relative position of the light extraction elements within the luminaire. Specifically, the luminaire 40" has its light extraction fiber groups 49" fastened to the bottom part of the inner diffusing screen 42", and the decladded zone of the extraction fiber faces the reflective base plate of the luminaire. Here we chose to use a light extraction system in which the decladding was simply achieved by abrading a segment of the fiber (the segment 63 in FIG. 4C) so that the area of the exposed core vary according to the teachings of the copending application Ser. No. 07/813,972 (U.S. Pat. No. 5,222,795).

Since optical fibers used for the light extraction elements can be quite flexible one can produce a highly flexible luminaire by choosing flexible materials, for the enclosure's main elements (the diffusers, the base plane and the four vertical support structures). Furthermore, one can also manufacture, according to the principle of the instant invention, a foldable and inflatable embodiment of the luminaires of the instant invention. When such a luminaire is desired, I can add inflation/deflation openings 64 and 65 as illustrated in FIG. 4B, which can be capped and through which the luminaire ca be inflated and thus deployed to full size. When not in use, the luminaire can be deflated through the same openings 64 and 65 so as to reduce its size and facilitate its transportation.

One of the shortcomings of the embodiments described above involves their application when very high levels of luminous flux are desired. Since light emitting diodes have an overall efficiency of converting electricity to light in the range of 8% to 12%, the balance of the energy is dissipated as heat. When very high luminous output of about 5000 lumens per square meter and higher are required, the heat generated at the luminaire may become too high for passive dissipation and can cause an appreciable rise in the temperature of the luminaire. While this is partially alleviated with the optional heat exchanging system described above, in a number of environments, it is not advisable to have "live" electrical wiring and connections in the illuminated zone.

I can overcome these shortcomings by positioning the light source remotely from the luminaire and transmitting the light into the luminaire by optical fibers or optical wave guides. With this approach, high intensity light sources can be used, where the conversion of electricity to light is accomplished at the remote location, and thus heat removal is facilitated. Furthermore, the efficiency of a high intensity light source is, as a general rule, much greater than in small light sources.

Figure 5:
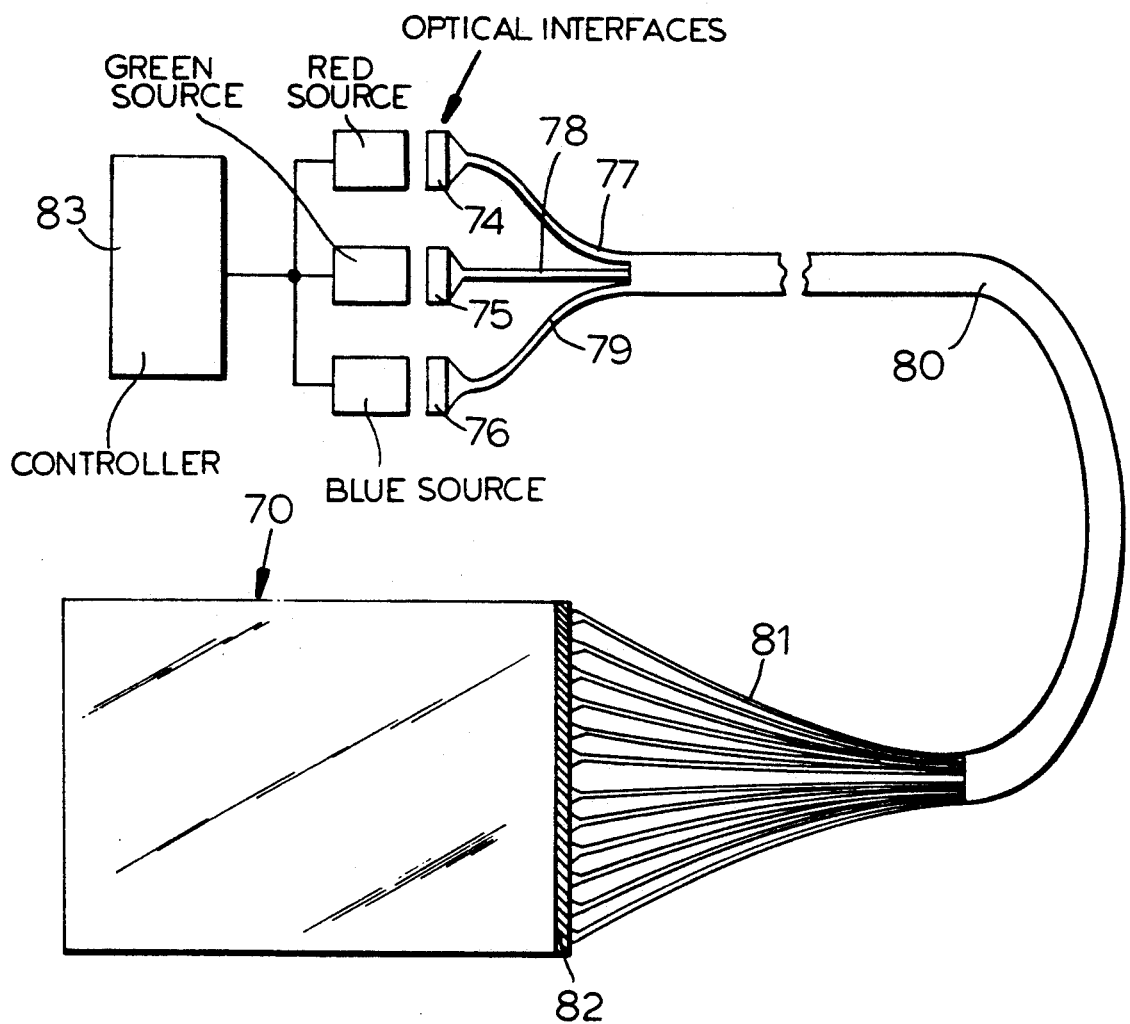
FIG. 5 is a diagram, partly in section, of a chromatic luminaire system based on light extractor fibers.

Such a system is schematically shown in FIG. 5. In this embodiment the luminaire 70 is located remotely from three complementary monochromatic light sources 71, 72 and 73, which can have the respective colors red, green and blue.

The light sources can be each a plurality of small light sources, for instance, light emitting diodes, or more intense light sources like gas discharge light sources (with the appropriate gaseous species to provide for the correct color). Each of the light sources faces its own optical interface system (74, 75 and 76 respectively), which concentrates the light from the light sources so that it efficiently enters each fibers within the bundles 77, 78 and 79 with the majority of the source's output within the angle of acceptance of the respective fibers. The number of optical fibers in each bundle equals the number of extraction fiber groups within the luminaire 70. When the light sources consists each of a plurality of small light sources, like light emitting diodes, then the systems 74, 75 and 76 are each simply a collection of lenses or small compound parabolic collectors (CPC) as in the prior art (for an extensive discussion of compound parabolic collectors one can consult W. T. Welford and R. Winston, "High Collection Nonimaging Optics", published by Academic Press, 1989, for instance chapter 11.6, page 213).

As mentioned above, each light source faces its respective light concentrating device, 74, 75 and 76, respectively, which concentrates the light from the sources into the angle of acceptance of each of the optical fibers in the bundles 77, 78 and 79. These bundles are consolidated into a master light guide or optical fiber bundle 80 which transmits the lights from the light sources to the luminaire 70 at a remote location.

Near the luminaire, the optical fiber is fanned out into sub-bundles 81, each containing one fiber that originated from the bundles 77, 78 and 79 respectively. In this manner, each sub-bundle 81 carries light into the luminaire from the three different light sources 71, 72 and 73 respectively as groups of tricolor light sources.

The luminaire 70 is constructed as described in FIGS. 3 or FIGS. 4A and 4B, with plurality of groups of three light extraction fibers, except that the light bar 45 of the luminaire of FIG. 3 is replaced with an optical connector 82 which assures that the light propagating through each fiber within the sub bundles 81 will enter its own respective light extractor fiber within the luminaire 70, while connecting the fibers contained in the optical bundle 8 to the luminaire 70. The bundle 80 will, of course, contain a number of optical fibers equal to the number of extraction fibers within the luminaire.

The design of the optical connector can be chosen according to the application. For instance, one can use the end parts of the fibers within the bundle 80 as light extractors by treating a distal end of a length about equal to the luminaire length as described in copending application Ser. No. 07/813,972 (U.S. Pat. No. 5,222,795). The connector 82 then simply serves to fasten these fibers to the luminaire. When the luminaire 70 and the optical fibers bundle 80 are independent elements, the connector 82 can be made of two elements each having a plurality (equal to the number of light extractor within the luminaire 70) of compound parabolic collectors (CPC). In this manner the bundle 80 would be terminated with a connector in which each CPC is attached to each fiber within the bundle, and similarly each light extractor within the luminaire would be terminated with a similar CPC (the design of these CPC will depend on the relative radii of the optical fibers within the bundle 80 and the light extractors within the luminaire as well as their relative angle of acceptance as described in the above cited reference). The connector 82 can simply be a device bringing all the CPC from one element (for instance the bundle 80) to face the CPC of the second element (in this case the luminaire 70) so as to transmit the light propagating trough the bundle's fibers to their respective light extractors within the luminaire.

The operation of the system is straight forward as described for the embodiments depicted in FIGS. 3, 4A and 4B above, whereby the perceived color of the luminaire is controlled by the controller 83 that meters the quantity of light flux emitted by each of the light sources 71, 72 and 73.

It should be clear to a person skilled in the art that one could use the extraction fibers based luminaires of the instant invention for the purpose of providing white light in places where it is not desired to have electrical connections, or where the fragility of glass based luminaires is incompatible with the environment.

Figure 6:
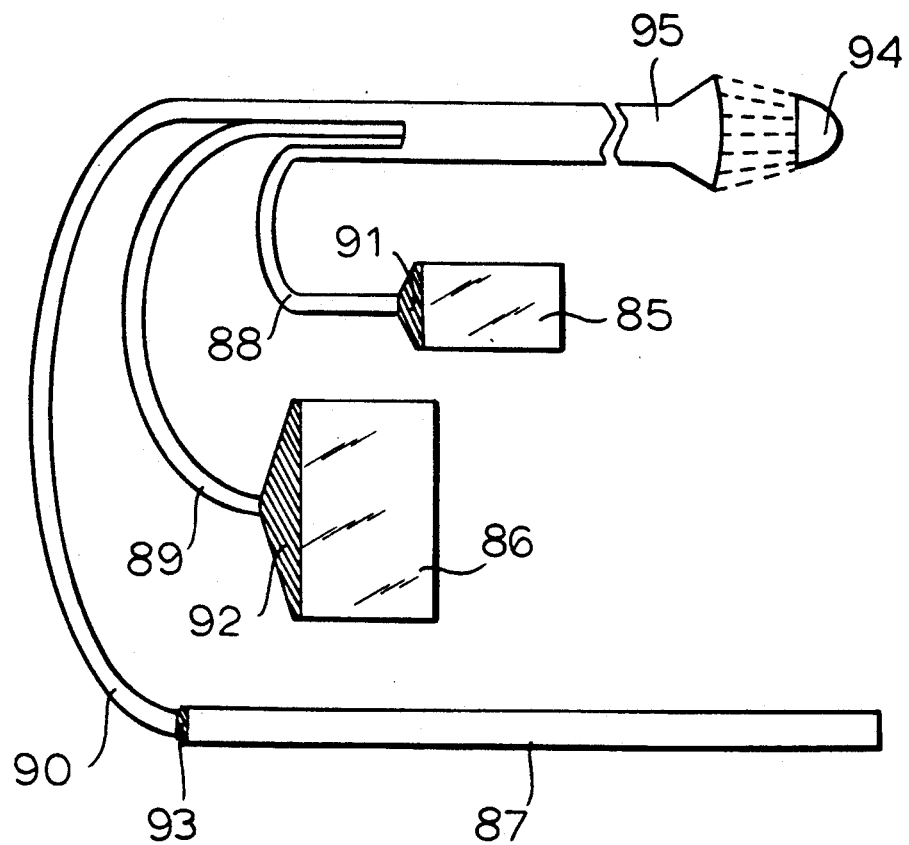
FIG. 6 is a similar view of an extractor-based white light luminaire where the light source and the luminaire are remotely positioned relative to each other.

As an example of this embodiment of the instant invention, consider FIG. 6, which shows a system of three light extraction based luminaires 85, 86 and 87. These luminaires have been designed with drastically different aspect ratios to demonstrate the flexibility of sizing for such luminaires enabled by the instant invention. Each of these luminaires is connected to its respective bundle of optical fibers 88, 89 and 90 respectively, with multifiber connectors 91, 92, and 93 respectively Such multifiber connectors can be made from compound parabolic reflectors as described above. If the diameter of the optical fibers in the bundles 88, 89 and 90 is identical to the diameter of the light extraction fibers within the luminaires, then the receptor side of the connector, to which the extraction fibers within the luminaires are connected will have the same compound parabolic connectors (see for instance W. T. Welford and R. Wilson, "High Collection Nonimaging Optics", page 214, Academic Press, 1989), and these collectors will face each other (the large side of the CPC or the collection aperture). Therefore, all light rays transmitted to the connectors through the fibers enter their respective light extractors within the luminaire.

When the diameters of the fibers in the bundle differ from the diameters of the extraction fibers, the opposing compound parabolic collectors (in the connector on the bundle and in the receptor on the luminaire) must be of the type $\theta_i/\theta_o$ (see last cited reference, page 247). Care must be given in the design of such systems to assure that the respective angle of acceptances of the guiding and extraction fibers are at least equal to $\theta_i$ and $\theta_o$, respectively, to minimize losses and back reflections at the connectors.

The bundles from each luminaire can be consolidated into a single bundle as shown in FIG. 6, and interfaced to a single light source, or each bundle can be illuminated with its own light source.

At the opposing end of the optical fibers bundles the light from a large light source, 94, for instance a high intensity discharge source, is collimated to illuminate the end of the fibers. To increase the efficiency of collection of the light from the light source, refractive or reflective optical element, 95, can be used. A high collection efficiency can be achieved by using a specially designed molded multilens system, consisting of an hexagonal array of small lenses facing the light source.

The number of lenses would equal the number of fibers in the bundle. The termination of each fiber is with a small CPC, facing the collection multilens. Such a system is capable of collecting about 60% to 75% of the light emitted from the light source and guiding the light to the luminaires which will distribute the light homogeneously over their emitting surfaces.

Higher collection efficiencies can be achieved by more complex optics which would collect some of the light which escape between the fibers.

It should be understood that fibers used in the embodiment of the instant invention are usually of relatively large diameters in the range of 1 to 10 mm, and the manufacture of the optical interface in replicated optics is thus straight forward.

The system described in FIG. 6 is particularly suitable for illumination of manufacturing facilities where hazardous explosive or petrochemical materials are processed. In such a case, the light source 94 and the collection optics 95 are placed within an explosion proof enclosure and the fiber bundles 88, 89 and 90 are interfaced to the optics via sealed openings in the explosion proof enclosure. Light from the luminaires 85, 86 and 87 can thus be provided without the usual hazards associated with electrical contacts in such an environment. One could also place the light sources for a large plurality of luminaires in a central location which can be better suited than the actual environment were the hazardous materials and processes are located and conduit the light through appropriate low losses optical fibers to the luminaires.

Figure 7:
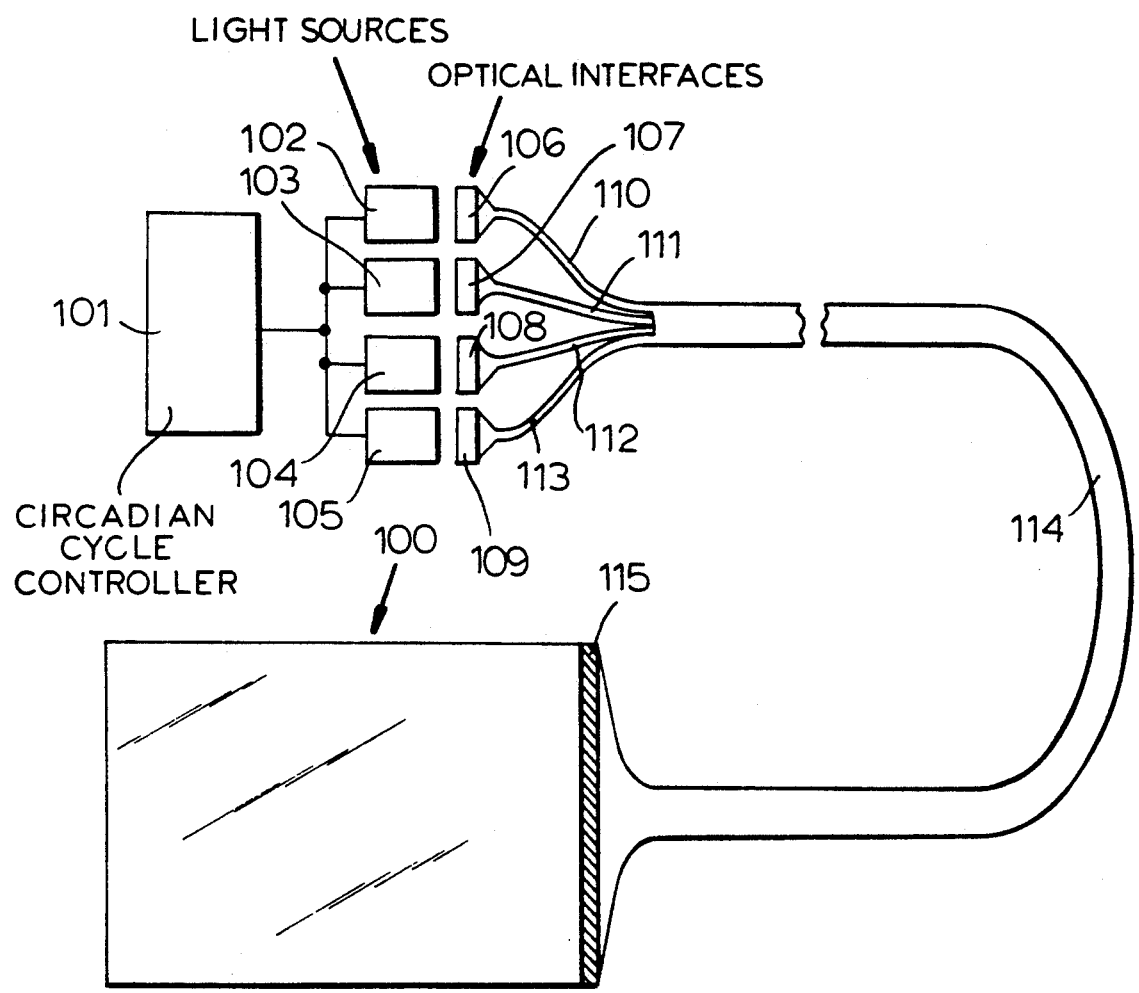
FIG. 7 is a view similar to FIG. 5 of a human circadian adjusting system using light-extractor-based luminaire of the instant invention.

In FIG. 7 we show a typical system based on the instant invention used for the implementation of shifting and control of human circadian cycles. C. A. Czeisler recommends the use of doses of light at fluxes exceeding 7,500 lux (see U.S. patent application Ser. No. 07/066,677). In implementing this technology, it is necessary to reject very large quantities of heat, since a typical light module of 8'×4' needs to be powered with 1.2 to 1.5 kW of light sources, of which about 80% is rejected as heat.

Furthermore, it is helpful to simulate a dawn to full light and full light to dusk transition during the start and ending of the doses proposed. Specifically, the luminaire 100 in FIG. 7 has typical dimensions of 8'×4', and has 37 groups of light extracting fibers running along its length. Unlike the luminaires described earlier, each group is composed of four light extractors rather than three as described in FIGS. 3, 4A and 4B. The luminaire is as described above in all other aspects.

A circadian cycle controller 101 in which are embedded specific algorithms and software, as described in "Assessment and Modification of Circadian Phase and Amplitude" (patent application Ser. No. 07/365,949 by C.A. Czeisler and E. Kronauer), controls the timing of turning on and off the four light sources 102, 103, 104, and 105. The first three light sources are typically HID sources of about 400 Watt each emitting about 36,000 lumens into an angle of 23° (manufactured by Phillips Corp. of Eindhoven in the Netherlands). The fourth light source, 105, is designed to emit mostly light of wavelengths longer than 620 nanometer (red light). Each of the light sources faces a weak concentrator (106, 107, 108 and 109) that projects the light on an hexagonal array of 37 large diameter (about 3 mm diameter) fibers, which are then consolidated into sub-bundles 110, 111, 112 and 113 respectively. These sub-bundles are further consolidated into a single bundle 114 which interfaces to a connector 115, as described above, on the luminaire 100.

The controller initiates the light dosing with the red source (105) first and then according to a predetermined program, switches on the HID light sources consecutively. The initial dose of red light followed by red light intermixed with the first HID white light simulate the dawn to full light transition. The red light is then switched off and the additional HID are switched on. At full intensity the luminaire emits more than 60,000 lumen as required. The light sources and the concentrators are located in a facility, or a shelter outside the room where the treatment is given, and thus problems associated with heat rejection into working or living habitats are circumvented.

Lighting of highway signal usually involves light sources that illuminate the sign and are positioned either at the base or at the top of the highway sign. When such light sources require maintenance or service, traffic need be diverted to other lanes causing disruption. One can use the luminaire described in FIG. 6 and affix opaque or semi-opaque signage to the front of the luminaire. The light sources would be positioned at the base of the posts supporting the sign, and the light transmitted to the sign via optical fibers as described herein. This will facilitate maintenance of illuminated signage and remove the periodic hindrance of maintenance crews on the roads.

When using opaque signage, one can use adhesive reflective tapes with the reflecting surface facing the luminaire to further enhance use of the light emitted by the luminaire. Since the luminaire's inner surfaces are highly reflective, a portion of the light reflected from the back of the opaque signage will be reflected through the transparent part of the sign.

For very large luminous lettering or standard luminous highway signs, one can form the desired shapes or letters from luminaires as described in the instant invention (see for instance the various shapes in FIG. 6).

As mentioned above, one of the advantages of the light extraction based luminaires of the instant invention is that the illuminated site and the site where electricity is converted to light can be remotely positioned from each other. This creates a family of luminaires that can be freely washed or even immersed in water. In the following we describe a specific application of such luminaires to the construction of bathing appliances. Such bathing appliances are expected to find uses in the amelioration of "cabin fever syndrome" and other disorder associated with light dosage insufficiencies.

Figure 8A:
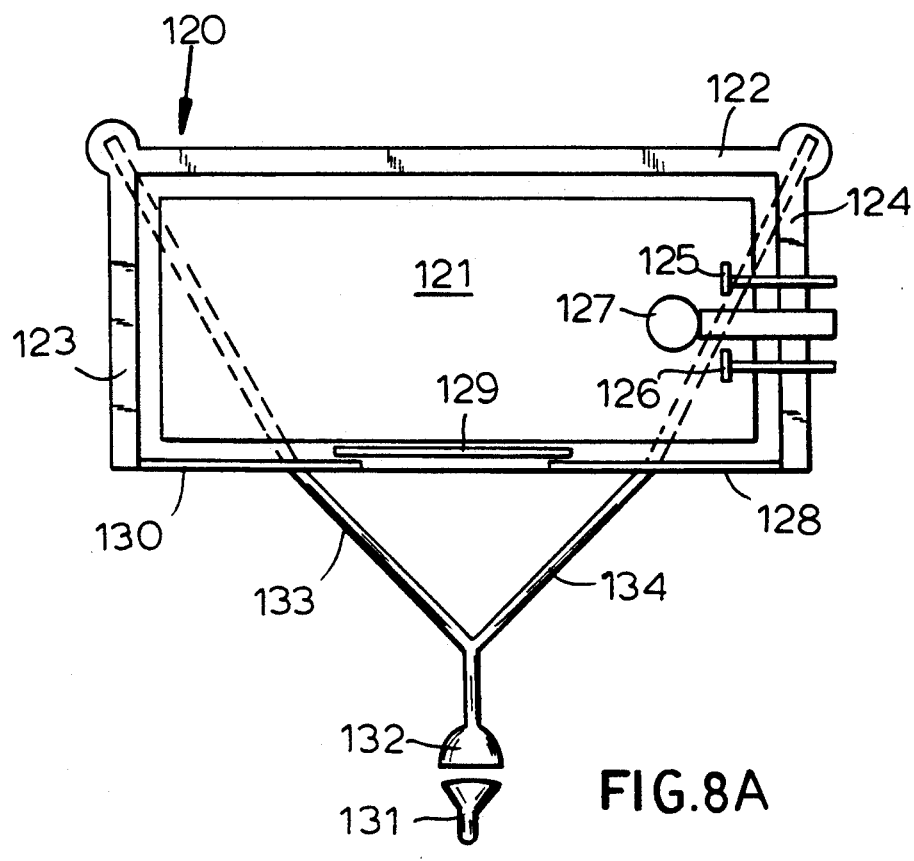
FIGS. 8A and 8B are respectively a top and rear cross sectional view of an illuminated bathing unit using light-extractor-based luminaires of the instant invention.
Figure 8B:
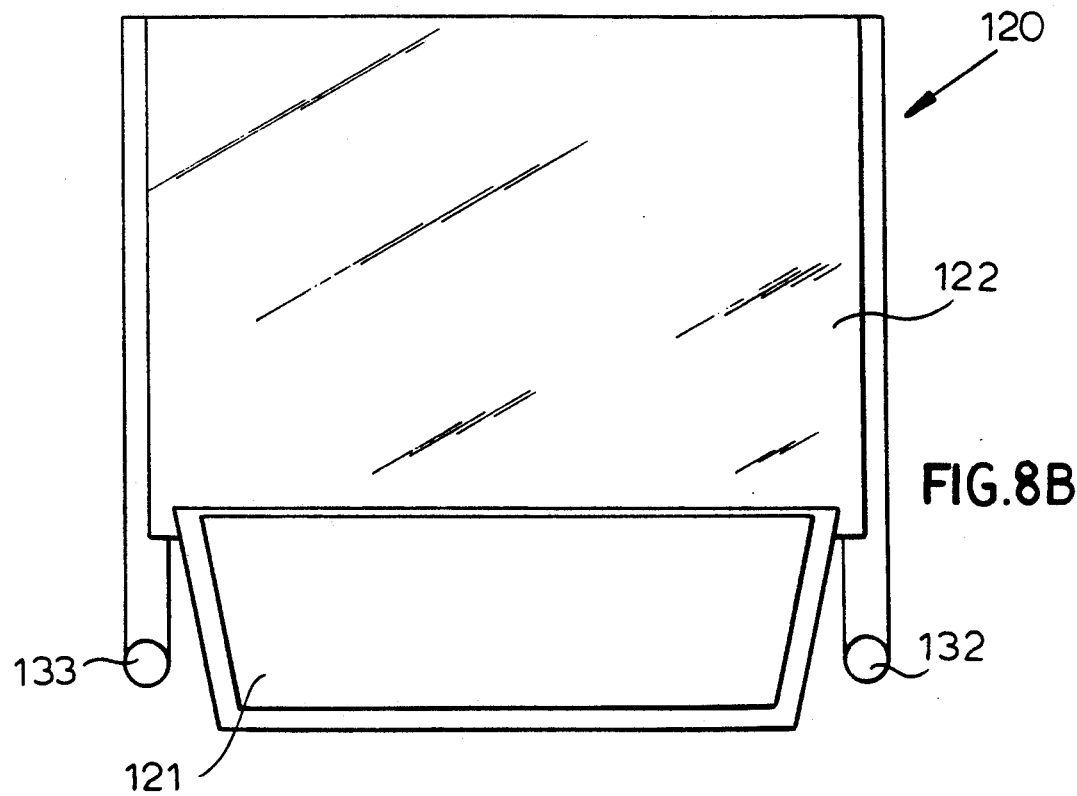

FIG. 8A shows a top cross sectional view of a bathing unit 120 and FIG. 8B shows a cross section through the back wall of the same unit. The tub 121 can be made as in the prior art from molded glass fiber reinforced polymers. The back wall of the bathing enclosure, 122, is made from a light extractor based luminaire as described in FIG. 6 (the luminaires 85 or 86), as are the two side walls 123 and 124. The side wall 124 contains a plurality of sealed perforations through which the faucets 125 and 126 and the shower head 127 are inserted and then sealed in place with an appropriate sealant. To the extent that these perforations need to intersect the path of some of the light extractors in the light extraction element 124, one can easily bend the extractors around these perforations during the manufacturing process without impairing the operation of the system to any significant extent.

In most practical applications, the sliding doors would not serve as light sources to eliminate the need for a movable light connectors. It should be clear however, that such connectors could be fastened on the top side of these doors and allow for the doors to serve as light sources as well, without a need to create a movable seal.

A light source, 131, for instance, an HID bulb as described with reference to FIG. 7 (102), facing a concentrator, 131, which direct light into a plurality of optical fibers in a bundle, 132, is located remotely from the bathing unit, 120, in a manner similar to that practiced for steam systems in other bathing units, namely in an external cabinet, or above the ceiling of the bathroom (an unused attic space under the house roof), or in the basement where other appliances are located. The bundle is split into a plurality of sub-bundles (133 an 134 in FIGS. 8A and 8B), according to the number of independent luminaires which form the enclosure. The sub-bundles transmit the light generated in the remote location to each of the luminaires through appropriate connectors described earlier.

It should be clear that, if desired, the tub 121 itself could be equipped with light extractors as well so as to provide all around illumination in the bathing unit. Other similar applications while not described in details, like lighting of swimming pools, or the bottom side of "glass bottom" boats are feasible as well with the luminaires of the instant invention.

A system as described in FIG. 5 can be provided for illuminating clean rooms within a semiconductor foundry, except that only two light sources like 71 and 72 are provided. One light source is a white light, like a standard HID bulb as described in conjunction with FIG. 7, and the second is a sodium vapor HID light source emitting yellow light.

The controller 83 can be made to chose to illuminate the luminaire 70 with either yellow light or white light and the light sources are remotely positioned from the luminaire. The advantage of this system over current lighting of semiconductor foundry clean rooms is that it provides optimized illumination for the different processes taking place, some of which require the yellow light due to process sensitivity to shorter wave length. Furthermore, the positioning of the light source in bays outside the clean room greatly facilitate keeping the particle counts within the room low.

The same system where the sodium light is replaced with a red light can be installed in photographic dark room, where the films being developed in parts of the process will be damaged when exposed to normal white light. The advantage of this system is that a single installation can provide for both lighting conditions required in dark rooms rather than two independent systems as is currently the practice.

While the invention has been described in its preferred embodiments, it is to be understood that changes within the purview of the appended claims may be made without departing from the true scope and spirit of the invention in its broader aspects.

I claim:

1. A luminaire, comprising:
    a housing;
    a light-transmissive diffuser extending across said housing for diffusing light impinging upon said diffuser from within said housing;
    a multiplicity of spaced apart elongated light guides in said housing emitting light continuously over respective lengths thereof, each of said light guides being cladded optical fiber having a cladding removed over a portion of a periphery thereof and for the entire respective length of light emission therefrom; and
    means at an end of said housing or injecting light into corresponding ends of said light guides.

2. The luminaire defined in claim 1 wherein said light guides are grouped in groups of light guides emitting light of different complementary colors, said colors mixing at said diffuser, said means at said end of said housing controllably injecting light of corresponding color into the respective light guides.

3. The luminaire defined in claim 1 wherein said housing said light guides and said diffuser are flexible allowing bending of the luminaire.

4. The luminaire defined in claim 1 wherein said light guides are disposed in a plane parallel to a specularly or diffusely reflective surface.

5. The luminaire defined in claim 4 wherein said light guides are disposed adjacent said specularly or diffusely reflective surface.

6. The luminaire defined in claim 4 wherein said light guides are spaced from said specularly or diffusely reflective surface.

7. The luminaire defined in claim 1 wherein said means at an end of said housing for injecting light into corresponding ends of said light guides includes at least one light emitter in said housing assigned to each light guide.

8. The luminaire defined in claim 7, further comprising means for cooling said end of said housing.

9. The luminaire defined in claim 1 wherein said means at an end of said housing for injecting light into corresponding ends of said light guides includes at least one light source remote from said housing and fiber optics optically connecting said source with said light guides.

10. The luminaire defined in claim 9 wherein said light source includes respective sources of light of different colors to be mixed at said diffuser and delivered to respective light guides by said fiber optics.

11. The luminaire defined in claim 9 wherein said housing is water-tight and the luminaire is water immersible.

12. The luminaire defined in claim 9 wherein said luminaire is one of a plurality of luminaires connected to a common light source by said fiber optics.

13. The luminaire defined in claim 11 wherein said diffuser forms a wall of a bathing facility.

14. The luminaire defined in claim 1, further comprising a light source connected to each of said light guides and selected from the group which consists of LEDs, laser diodes, gas discharge and HID sources.

15. The luminaire defined in claim 1 wherein at least one of said light guides is provided with at least one optical element forming collection optics.

16. A luminaire, comprising:
    an inflatable and deflatable housing;
    a light-transmissive diffuser extending across said housing for diffusing light impinging upon said diffuser from within said housing;
    a multiplicity of elongated light guides in said housing emitting light over respective lengths thereof;
    means at an end of said housing for injecting light into corresponding ends of said light guides; and
    means for introducing a gas into and removing a gas from said housing.

* * * * *